United States Patent [19]
Bowen et al.

[11] Patent Number: 5,735,560
[45] Date of Patent: Apr. 7, 1998

[54] SAFETY GUARD

[75] Inventors: Mark A. Bowen, Beverly Hills; Mims Bowen, Santa Monica, both of Calif.

[73] Assignee: Public Transporation Safety Devices Corp., Los Angeles, Calif.

[21] Appl. No.: 716,275

[22] PCT Filed: Apr. 13, 1995

[86] PCT No.: PCT/US95/04569

§ 371 Date: Sep. 30, 1996

§ 102(e) Date: Sep. 30, 1996

[87] PCT Pub. No.: WO95/28300

PCT Pub. Date: Oct. 26, 1995

Related U.S. Application Data

[63] Continuation-in-part of Ser. No. 227,928, Apr. 15, 1994, Pat. No. 5,462,324.

[51] Int. Cl.⁶ .................................................. B60R 19/00
[52] U.S. Cl. .............................. 293/15; 293/38; 293/58; 280/849
[58] Field of Search ..................... 203/1, 15, 38, 203/112, 141, DIG. 1, 58; 296/178, 198; 280/849

[56] References Cited

U.S. PATENT DOCUMENTS

| | | | |
|---|---|---|---|
| 2,406 | 12/1841 | Naglee et al. | 293/58 |
| 3,450 | 2/1844 | Tolles | 293/58 |
| 39,011 | 6/1863 | Gillen | 293/58 |
| 45,316 | 12/1864 | Castor | 293/58 |
| 55,663 | 6/1866 | Jenkins | 293/58 |
| 79,600 | 7/1868 | Riley | 293/58 |
| 159,632 | 2/1875 | Blackford et al. | 37/203 |
| 190,563 | 5/1877 | Day | 37/203 |
| 195,738 | 10/1877 | Wood | 293/58 |
| 217,676 | 7/1879 | Brown | 293/58 |
| 220,082 | 9/1879 | Mahon | 293/58 |
| 223,473 | 1/1880 | Brisac | 293/58 |
| 226,970 | 4/1880 | Brisac | 293/58 |
| 238,258 | 3/1881 | Stephenson | 293/58 |
| 339,857 | 4/1886 | Clarke | 293/58 |
| 340,561 | 4/1886 | Creager | 293/48 |
| 346,762 | 8/1886 | Marston | 293/58 |
| 347,269 | 10/1886 | Goldsmith | 293/58 |
| 354,831 | 12/1886 | French | 293/48 |
| 364,230 | 6/1887 | Durfee | 37/203 |
| 381,881 | 4/1888 | Mahon | 293/58 |
| 394,975 | 12/1888 | Hachenberg | 293/48 |
| 470,362 | 3/1892 | Nagele | 293/58 |
| 488,353 | 12/1892 | Gamage et al. | 293/48 |
| 489,320 | 1/1893 | Mortimer et al. | 293/48 |
| 489,848 | 1/1893 | Clarke | 293/58 |
| 490,772 | 1/1893 | Mahon | 293/48 |
| 523,208 | 7/1894 | Kelleuner | 37/203 |
| 547,707 | 10/1895 | Breul | 293/58 |
| 551,700 | 12/1895 | Walier | 293/7 |
| 587,060 | 7/1897 | Noraconk | 293/58 |
| 709,208 | 9/1902 | Crandal | 293/58 |
| 711,569 | 10/1902 | Hollis | 293/58 |
| 734,968 | 7/1903 | Schwinger, Jr. | 293/58 |
| 806,143 | 12/1905 | Hoey | 293/58 |

(List continued on next page.)

FOREIGN PATENT DOCUMENTS

| | | |
|---|---|---|
| 2220674 | 11/1973 | Germany. |
| 243677 | 3/1987 | Germany. |
| 404-176784 | 6/1992 | Japan. |
| 153794 | 11/1920 | United Kingdom. |
| 284874 | 2/1928 | United Kingdom. |
| 809624 | 2/1959 | United Kingdom. |

*Primary Examiner*—Joseph D. Pape
*Attorney, Agent, or Firm*—Everett G. Diederiks, Jr.

[57] ABSTRACT

A safety barrier (20) for a vehicle (22) includes a safety barrier portion (38, 100) for deflecting objects from the path of the wheels (24) of the vehicle (22). The safety barrier (20) further includes a wheel well molding (32, 66, 101) to prevent the placement of hands or limbs between the wheel well (26) and wheel (24) of the vehicle (22).

8 Claims, 8 Drawing Sheets

U.S. PATENT DOCUMENTS

| | | | |
|---|---|---|---|
| 821,863 | 5/1906 | Derr | 293/58 |
| 826,768 | 7/1906 | Craley | 293/58 |
| 914,985 | 3/1909 | Sprint | 293/58 |
| 962,323 | 6/1910 | Deemer et al. | 293/58 |
| 1,002,114 | 8/1911 | Barnes | 293/58 |
| 1,011,214 | 12/1911 | Lillich | 293/58 |
| 1,013,078 | 12/1911 | Simon | 104/279 |
| 1,050,405 | 1/1913 | Gelder | 293/58 |
| 1,060,475 | 4/1913 | McGowan | 293/58 |
| 1,065,055 | 6/1913 | Lawrence | 293/58 |
| 1,072,965 | 9/1913 | Manteau | 293/58 |
| 1,091,409 | 3/1914 | West | 293/58 |
| 1,095,017 | 4/1914 | Minnich | 293/58 |
| 1,099,058 | 6/1914 | Kruckow | 293/58 |
| 1,104,467 | 7/1914 | Finkelstein . | |
| 1,157,460 | 10/1915 | Throckmorton | 293/58 |
| 1,218,583 | 3/1917 | Rubenstein | 293/58 |
| 1,222,828 | 4/1917 | Weinberg | 293/58 |
| 1,230,911 | 6/1917 | Loeb | 293/58 |
| 1,232,835 | 7/1917 | Ostrowiecki | 293/38 |
| 1,283,428 | 10/1918 | Tookey | 293/58 |
| 1,295,692 | 2/1919 | Canton | 293/58 |
| 1,325,690 | 1/1919 | Canton | 293/58 |
| 1,325,705 | 12/1919 | Sleeman | 293/58 |
| 1,397,825 | 11/1921 | Thompson | 293/58 |
| 1,411,254 | 4/1922 | Braucci | 293/58 X |
| 1,412,524 | 4/1922 | Howard | 293/58 |
| 1,416,610 | 5/1922 | Cochran | 293/58 |
| 1,464,205 | 8/1923 | Kuno | 293/58 X |
| 1,523,623 | 1/1925 | Altman | 293/58 X |
| 1,530,017 | 3/1925 | Souliotis | 293/134 |
| 1,581,041 | 4/1926 | De Barrios | 293/58 |
| 1,586,786 | 6/1926 | Davies | 294/58 |
| 1,691,018 | 11/1928 | Scott | 293/58 |
| 1,700,645 | 1/1929 | Ritenour | 293/58 |
| 1,737,952 | 12/1929 | Storch et al. | 293/58 |
| 1,742,148 | 12/1929 | Ritanour | 293/58 |
| 1,748,304 | 2/1930 | Miyaoka | 293/58 |
| 1,805,933 | 5/1931 | Victor | 293/58 X |
| 1,885,611 | 11/1932 | Lilley | 293/58 X |
| 1,899,937 | 3/1933 | Brown . | |
| 1,936,054 | 11/1933 | Herzbecker | 293/58 |
| 2,017,227 | 10/1935 | Barnhart . | |
| 2,078,679 | 4/1937 | Golphin . | |
| 3,784,226 | 1/1974 | Wilfert et al. . | |
| 3,784,244 | 1/1974 | Emi . | |
| 3,794,373 | 2/1974 | Manning . | |
| 3,809,167 | 5/1974 | Glider . | |
| 3,913,963 | 10/1975 | Persicke . | |
| 3,956,111 | 5/1976 | Manfredi . | |
| 4,076,295 | 2/1978 | Gutman . | |
| 4,077,141 | 3/1978 | Stedman . | |
| 4,093,290 | 6/1978 | Pearson . | |
| 4,103,918 | 8/1978 | Salden . | |
| 4,203,623 | 5/1980 | Fenner et al. . | |
| 4,249,632 | 2/1981 | Lucchini et al. . | |
| 4,362,310 | 12/1982 | Goodall . | |
| 4,620,745 | 11/1986 | Jacobs . | |
| 4,688,824 | 8/1987 | Herring | 280/762 |
| 4,763,939 | 8/1988 | Zhu . | |
| 4,877,266 | 10/1989 | Lamparter et al. . | |
| 4,930,823 | 6/1990 | Rivera . | |

SAFETY GUARD

This application is a continuation-in-part of prior U.S. patent application Ser. No. 08/227,928, filed Apr. 15, 1994 now U.S. Pat. No. 5,462,324.

BACKGROUND OF THE INVENTION

1. Field of the Invention

The field of this invention is vehicle safety devices for preventing animate and inanimate objects from being crushed or damaged by the wheels or chassis of the vehicle upon which the safety device is incorporated.

2. Scope and Content of the Prior Art

For many years automotive vehicles have been a primary means of transporting individuals in many metropolitan areas. Buses have been used with great success as a means of mass transit in these metropolitan areas. Additionally, heavy, wheeled vehicles have been used for myriad industrial applications throughout the years.

With this advent of buses and other heavy wheeled vehicles, a problem has arisen. These vehicles, especially buses in metropolitan areas, cause injury to individuals and objects. Many of the most serious of these injuries are a result of individuals being run over by the vehicle. Injuries often occur when the wheel or chassis of the vehicle travels over an individual who has slipped and fallen in the road, crushing a limb or other body part of an individual as the weight of the vehicle is applied to the individual. Analogously, inanimate objects in the path of the wheels may also be crushed.

Similarly, injuries also occur when buses drive close to a curb and an individual has stepped off the curb before the bus has passed the individual. In this scenario, the wheels of the bus travel over the individual's foot, squashing the foot, causing severe pain and injury to the hapless pedestrian.

Further injuries can occur when individuals exit from a bus. Sometimes individuals slip as they depart from the bus and in an attempt to regain balance, grab the wheel of the bus, placing a hand or arm in the gap between the wheel and wheel well of the bus. When the bus starts moving, the individual's arm or hand is propelled along in the direction of the rotation of the moving wheel. Typically the individual's arm or hand is caught between the wheel and wheel well and is severely lacerated or mangled. If the individual is unfortunate enough not to have pulled his hand or arm away soon enough, the hand or arm may also be thrust to the ground in the path of the oncoming wheel. When the wheel travels over the hand or arm, the hand or arm is crushed by the wheel.

The liability incurred by municipalities for these types of injuries can run into the millions of dollars each year. Thus, there is a need for a reliable, effective, safety device that will prevent or minimize these types of injuries.

Various types of safety devices have been proposed by the prior art. For example, United States patents, (Emi) U.S. Pat. No. 3,784,244, (Gutman) U.S. Pat. No. 4,076,295, (Pearson) U.S. Pat. No. 4,093,290, (Lucchini-Kramer) U.S. Pat. No. 4,249,632 describe front guard devices that may be effective in minimizing injury to pedestrians who are walking upright in front of a moving vehicle. However, these devices do not provide protection for individuals who may be lying on the ground below the level of the front bumper of the vehicle. Neither do they provide protection for individuals who may have an arm or hand that gets caught between the wheel and wheel well of a vehicle.

Other devices, such as those disclosed in U.S. patents, (Pearson-Mitchell) U.S. Pat. No. 3,584,898, (Wilfert-Gotz) U.S. Pat. No. 3,784,226, (Morris) U.S. Pat. No. 4,138,129, (Logan) U.S. Pat. No. 4,169,608, (Laine) U.S. Pat. No. 4,378,120, describe coverings for tires and fenders. However, these devices do not suggest the safety features provided in the present invention. Further, these devices do not suggest combining the wheel coverings with safety features to prevent injury to individuals that may have fallen in front of a vehicle.

Therefore, a need was perceived for a safe, effective, reliable, and relatively inexpensive safety barrier that will protect individuals lying in the path of an oncoming vehicle as well as individuals who might cause a hand or arm to get caught between a wheel and wheel well of a vehicle.

SUMMARY OF THE INVENTION

The present invention provides a safety guard for a vehicle comprising a safety barrier mounted to the vehicle that will push individuals and inanimate objects lying in the path of a vehicle out of the path of the wheels of the vehicle. The safety barrier is positioned with the lower edge thereof above the ground so that the vehicle can move under normal conditions. However, the safety barrier is positioned close enough to the ground so that if an object is encountered, the safety barrier forces the object out from under the vehicle to a position out of the path of the wheels of the vehicle. The frontal guard can be mounted to either the vehicle body or chassis, or to the vehicle axle or suspension system. When used with vehicles that include a wheel that turns inwardly or outwardly with respect to the transverse axis of the vehicle, the invention further provides means to turn the safety barrier to track the movement of the wheel.

The frontal guard may also be provided with a front skirt comprising a strip of material, such as ¾ thick rubber, that extends from the frontal guard to the surface over which the vehicle travels. This skirt is sufficiently rigid that it can push aside movable objects such as a foot of a human being. Yet the material is resilient enough that it will deform and rebound to its prior shape when it encounters fixed objects, such as protruding manhole covers. Similarly, the frontal guard may also be provided with a side skirt, comprising either one or more strips of the same type of material as the front skirt. The side skirt serves a similar function of pushing aside movable objects while yielding to fixed objects.

The present invention may also be provided with a wheel molding that extends from the wheel well over the top of the wheel of the vehicle. By extending over the top of the wheel, the wheel molding prevents individuals from placing their hands, arms, or other limbs between the wheel and body of the vehicle. The wheel molding can also be constructed in the form of a fairing which covers the wheel to provide safety advantages.

While the invention has particular utility in combination with buses, it is also effective to prevent or reduce injuries by almost any vehicle, including but not limited to conventional passenger automobiles, trucks, and even smaller vehicles such as lawn mowers.

Accordingly, it is an object of the present invention to provide a safety guard for a vehicle. Other and further objects and advantages will appear hereinafter.

DESCRIPTION OF THE PREFERRED EMBODIMENTS

Figures 1, 2, 3:
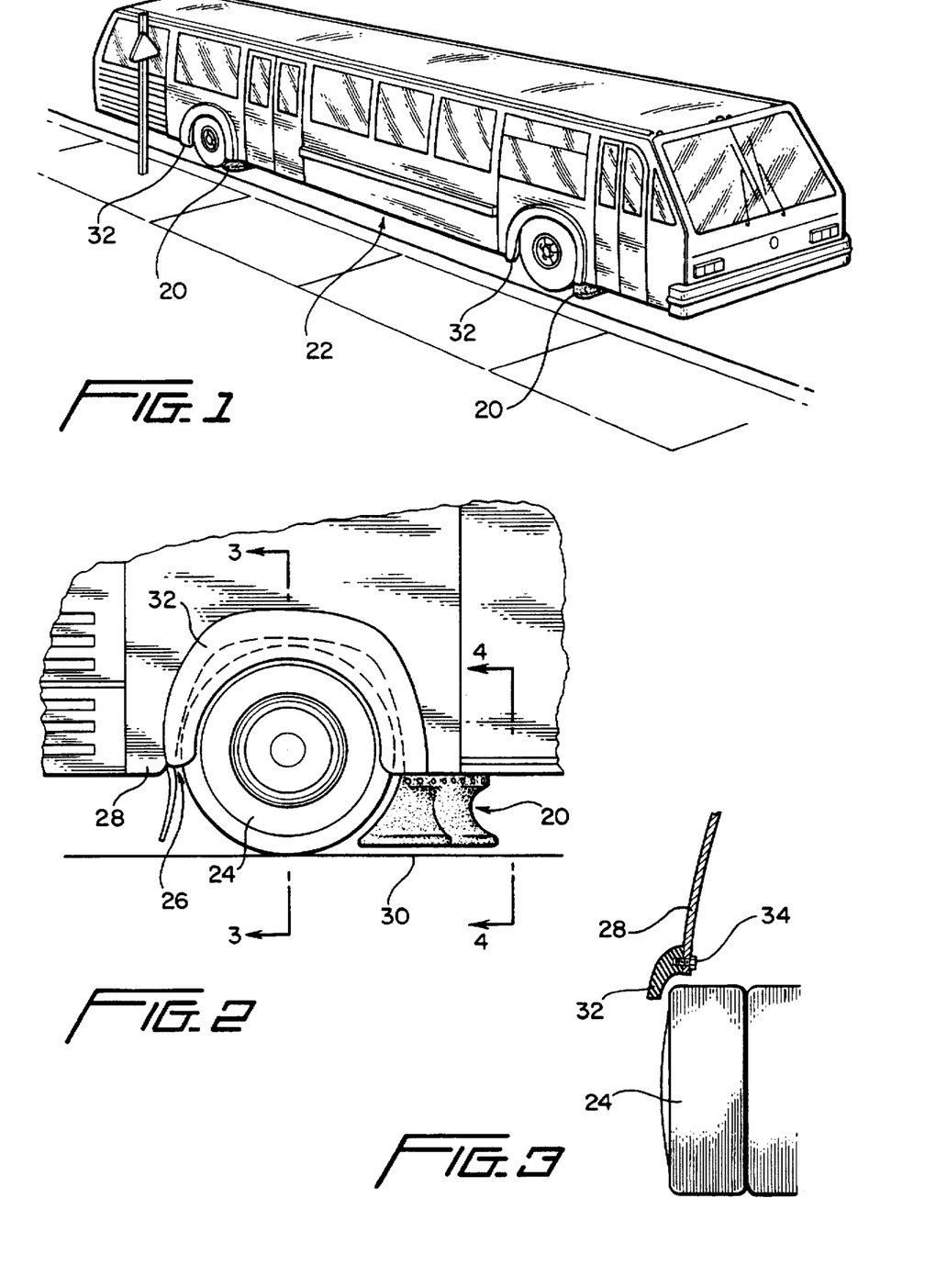
FIG. 1 is a perspective view of a bus type vehicle including safety guards according to this invention attached to the front and rear right side wheel wells.
FIG. 2 is a side view of the safety guard attached to a vehicle and shows how the wheel molding of the safety guard overlies a wheel that does not turn inwardly or outwardly with respect to the transverse axis of the vehicle.
FIG. 3 is a sectional view taken along line 3—3 in FIG. 2 illustrating the placement of the wheel molding of the safety guard relative to a wheel of the vehicle that does not turn inwardly or outwardly with respect to the transverse axis of the vehicle.

Referring to the Figures, a safety barrier 20 and a wheel molding 32 are shown mounted to a vehicle 22 in FIG. 1. The vehicle 22 shown is in the form of a bus. As shown in more detail in FIG. 2, the bus includes a wheel 24, wheel well 26, and vehicle body 28. It will be readily appreciated that a vehicle of this general type can cause considerable injury to animate, as well as inanimate objects if driven over them, or if the objects are caught between the wheel and vehicle body. Such injuries can result from the wheels, chassis, or axles located between wheels. Considerable damage to the vehicle can also result if it is driven over solid or heavy inanimate objects.

Figure 5:
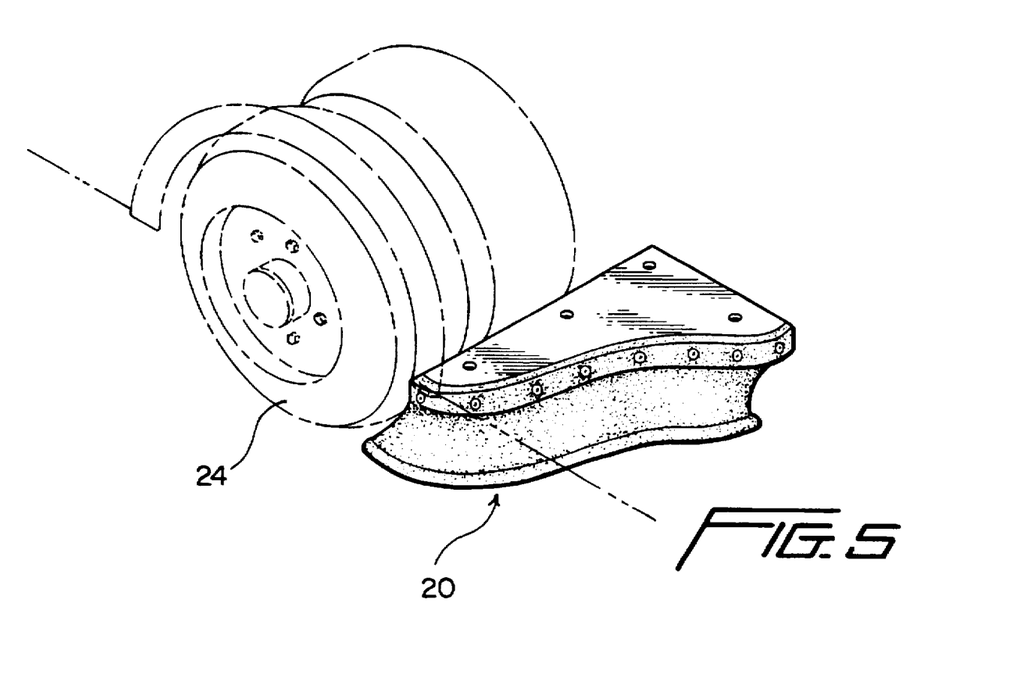
FIG. 5 is a perspective view illustrating the position of the safety barrier with respect to the wheel.

As shown in FIG. 2 and FIG. 5, a safety barrier 20 is located such that it generally faces obliquely with respect to the transverse axis of the vehicle 22 and is positioned to extend to a marginal distance above the surface 30 over which the vehicle 22 travels. Additionally, a wheel molding 32 is located such that it overlies the gap between the outermost edge of the wheel 24 and the wheel well 26.

As shown in FIG. 3, the wheel molding 32 may be connected to the vehicle body 28 around the edge that comprises the wheel well 26 with a plurality of bolts 34, screws, pins, clamps, clasps, or other attachment means widely known in the art. The wheel molding may be made of any suitably rigid material such as resin, plastic, rubber, metal, or wood.

Figure 4:
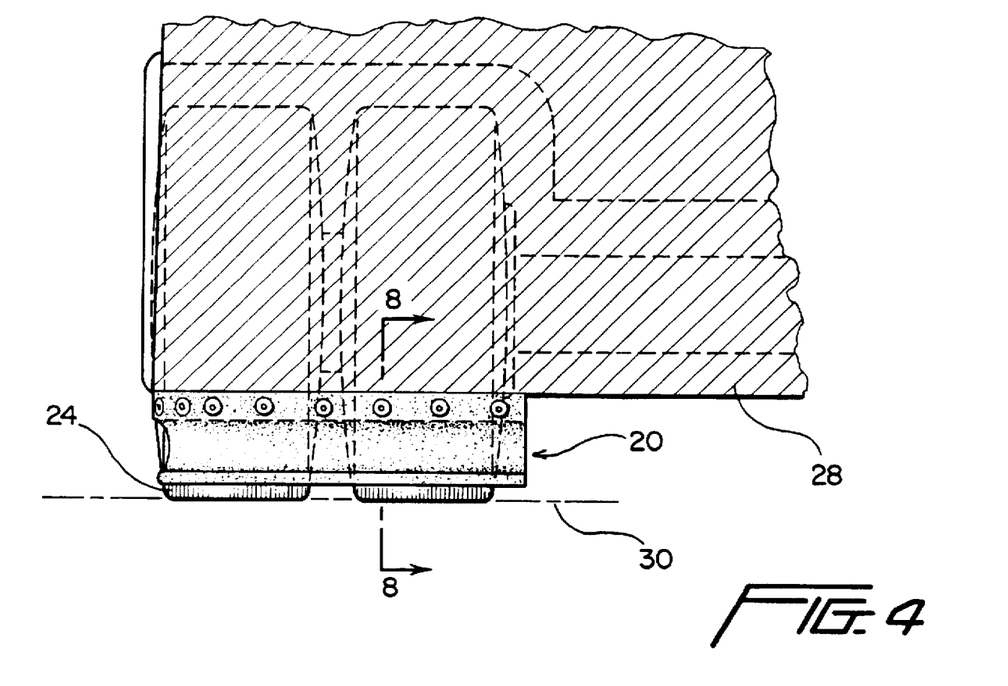
FIG. 4 is a view taken along line 4—4 in FIG. 2 illustrating the positioning of the safety barrier with respect to the vehicle wheel.

As shown in FIG. 4 and FIG. 5, in a preferred embodiment, the safety barrier 20 extends substantially across the wheels 24 in the transverse axis of the vehicle 22. The safety barrier 20 is mounted to the vehicle body 28.

Figure 6:
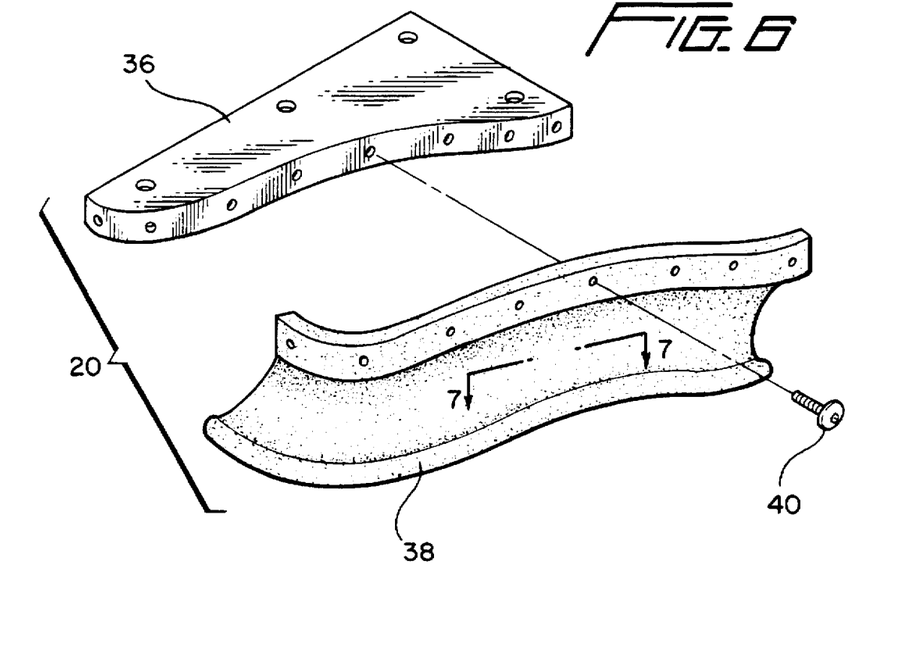
FIG. 6 is an exploded view of the safety barrier illustrating the mounting of the frontal guard to the body mount.

The safety barrier 20 may be constructed in one piece. Or, in the preferred embodiment, as shown in FIG. 6 the safety barrier 20, may consist of two pieces including a body mount 36 and a frontal guard 38. The body mount 36 may be made of any rigid and durable material such as metal. The frontal guard 38 may be connected to the body mount 36 with a plurality of bolts 40, screws, pins, clamps, clasps, or other attachment means widely known in the art. The frontal guard 38 may be may be made of any material that exhibits both resilience and rigidity, such as rubber.

Additionally, in an embodiment not shown, the frontal guard may be provided with a front skirt. The front skirt may be made of material that exhibits both rigidity and resilience, such as three-quarter inch thick rubber. The front skirt attaches to the frontal edge of the frontal guard with a plurality of bolts, screws, pins, clamps, clasps, or other attachment means widely known in the art. Similarly the frontal guard may be provided with a side skirt. The side skirt connects to the frontal guard along an outer edge of the frontal guard with a plurality of bolts, screws, pins, clamps, clasps, or other attachment means widely known in the art. The front skirt and side skirt extend from the frontal guard to a marginal distance above the surface 30.

Figures 7, 8:
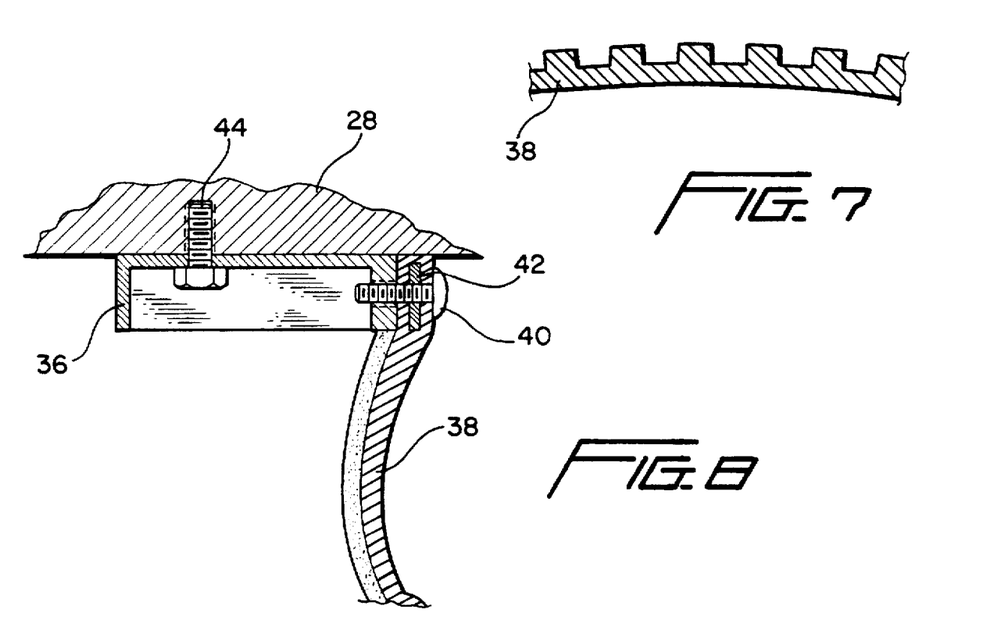
FIG. 7 is a view taken along line 7—7 in FIG. 6 illustrating the reinforced molding of the frontal guard.
FIG. 8 is a view taken along line 8—8 in FIG. 4 illustrating the mounting of the frontal guard to the body mount and the mounting of the body mount to the vehicle body.

FIG. 7 illustrates a molding of the material of the frontal guard 38 that may increase its rigidity. The frontal guard 38 will be rigid in places where it is likely to come into contact with a limb or other movable object. By being sufficiently rigid the frontal guard 38 will effectively force the limb or other movable object out of the path of the wheel 24 of the vehicle 22. Additionally, the frontal guard 38 will be resilient in places where it is likely to encounter immovable obstacles such as curbs. By being sufficiently resilient, the frontal guard 38 may bend to accommodate immovable objects, thereby avoiding damage to the safety barrier 20. The thickness of the frontal guard will vary depending on what type of material is used in its construction. When constructed with rubber, the frontal guard may have a thickness varying from three-quarters of an inch to one and one-half inches, more or less.

As shown in FIG. 8, the frontal guard 38 has embedded within it a frontal guard mounting reinforcement 42. The frontal guard mounting reinforcement 42 may be made of a rigid material such as metal. The frontal guard mounting reinforcement 42 serves to reinforce the connection between the frontal guard 38 and the body mount 36. Thus, the frontal guard mounting reinforcement 42 helps prevent tears that may have occurred had the frontal guard mounting reinforcement 42 been absent. The body mount 36 may be connected to the vehicle body 28 with a plurality of bolts 46, screws, pins, clamps, clasps, or other attachment means widely known in the art.

Figure 9:
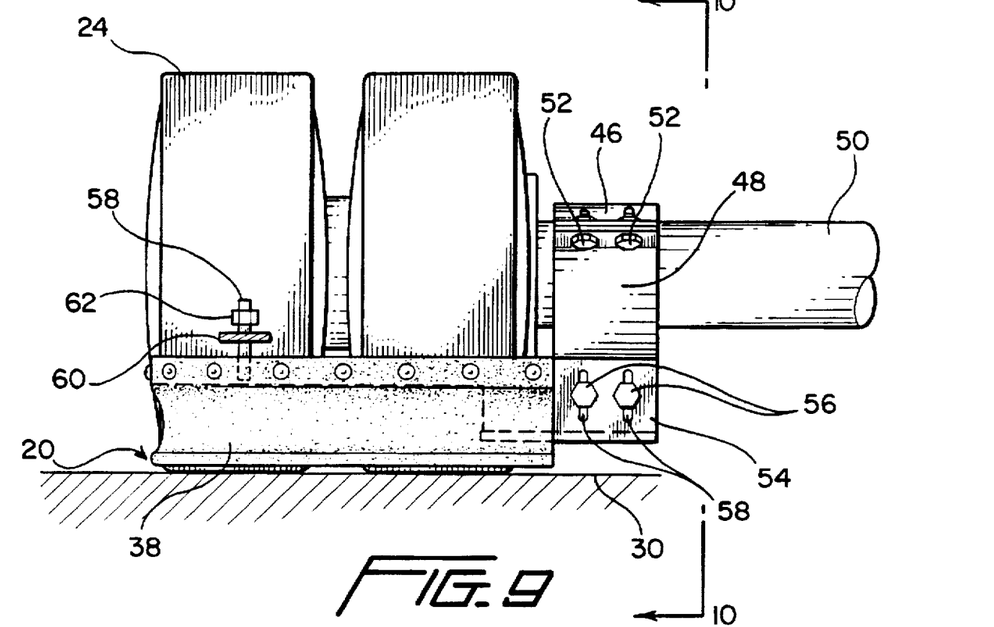
FIG. 9 illustrates the mounting of the safety barrier to the axle of the vehicle.

As shown in FIG. 9, in another embodiment, the safety barrier 20 is mounted with a first axle bracket 46 and a second axle bracket 48 to a portion of the vehicle 22 that remains relatively stable with respect to the wheel 24 of the vehicle 22 in the vertical direction. The vehicle axle 50 is a suitable mount. By mounting the safety barrier 20 to an unsprung portion of the vehicle 22 such as the vehicle axle 50, the safety barrier will track the shock absorbing movements of wheel 24, rather than the movements of the vehicle body 28 and will relatively infrequently impact the surface 30 over which the vehicle 22 travels, thus extending the useful life of the frontal safety barrier 20.

Figure 10:
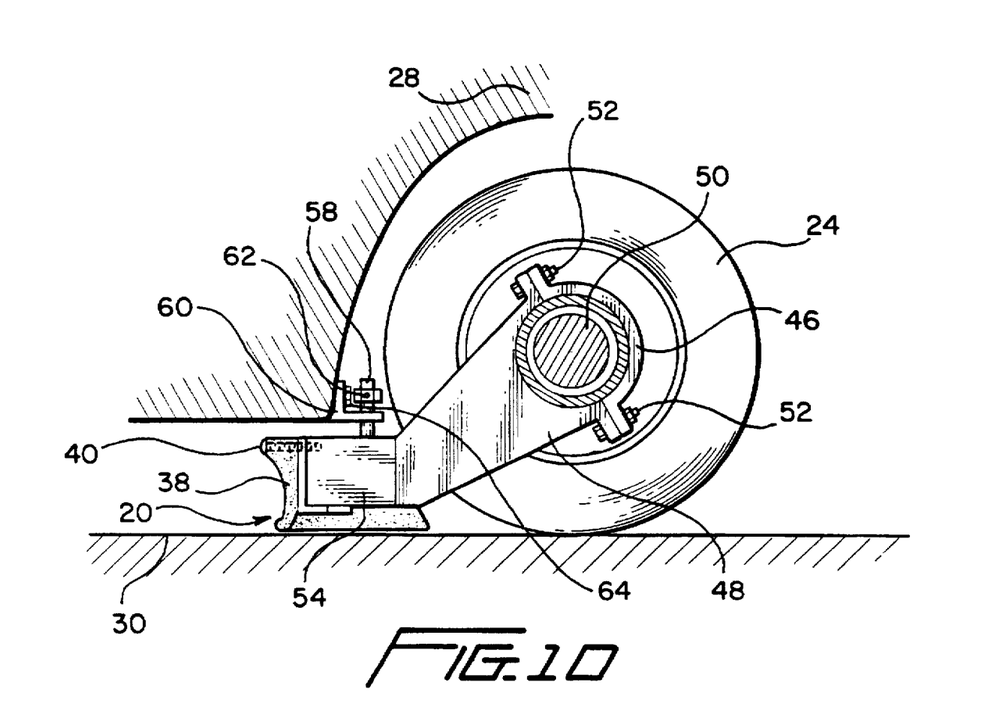
FIG. 10 is a view taken along line 10—10 in FIG. 9 illustrating axle brackets connected to the vehicle axle and the mounting of the frontal guard to the axle brackets.

As shown in FIG. 10, a first axle bracket 46 and a second axle bracket 48 secure the safety barrier 20 above the surface 30 over which the vehicle 22 travels. The first axle bracket 46 and the second axle bracket 48 encircle the vehicle axle 50, and are fastened to each other with a plurality of bolts 52, screws, pins, clamps, clasps, or other attachment means widely known in the art. The second axle bracket 48 extends from the vehicle axle 50 beyond the outer edge of the wheel 24 and toward the surface 30 over which the vehicle 22 travels.

As shown in FIG. 9, the second axle bracket 48 is connected to a bracket guard mount 54 which extends from the second axle bracket across the width of the frontal guard 38. The second axle bracket 48 mounts to the bracket guard mount 54 with a plurality of bolts 56, screws, pins, clamps, clasps, or other attachment means widely known in the art. The bracket guard mount 54 includes a plurality of adjustment slots 58 that allow for vertical adjustment of the frontal guard. The position of the safety barrier 20 is adjusted so that the safety barrier 20 is placed a predetermined distance above the surface 30. That distance may be approximately one-inch above the surface 30. The bracket guard mount 54 is designed such that the portion of the bracket guard mount 54 that will be closest to the outer edge of the vehicle, when mounted, does not extend as far downwards to the surface 30 as does the portion of the bracket guard mount 54 that is closest to the center of the vehicle, when mounted. Such a configuration of the bracket guard mount 54 allows the outer edge of the frontal guard 38 to collapse and be more resilient when encountering curbs and other immovable obstacles, while retaining greater rigidity towards the center of the vehicle 22.

As further shown in FIG. 9 and FIG. 10, a guide bolt 58 extends upwards from the bracket guard mount through a guide bolt mount 60. A guide bolt nut 62 is securely fastened to the guide bolt 58. This construction provides for flexibility in the vertical movement of the safety barrier 20, while retaining limits on how far upwards and downwards the safety barrier may extend. As shown in FIG. 10, the guide bolt mount 60 attaches to the vehicle body 28 with a bolt 64, screw, pin, clamp, clasp, or other attachment means widely known in the art.

Figure 11:
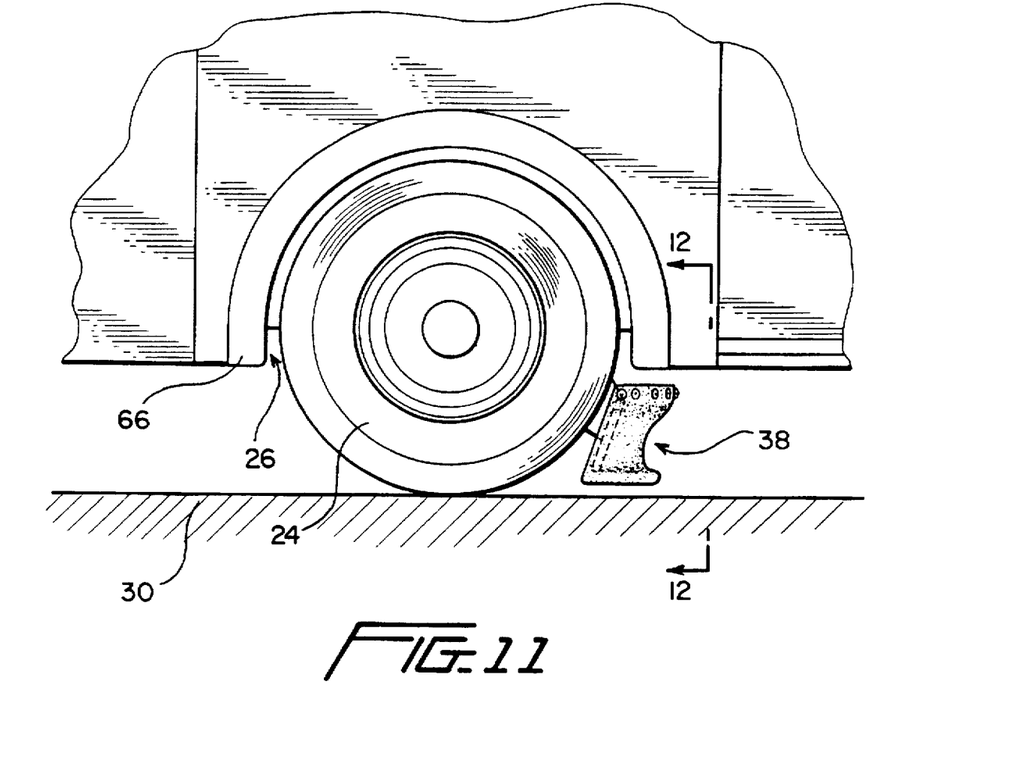
FIG. 11 is a side view of the safety barrier attached to a wheel well and shows how the wheel molding of the safety barrier overlies a wheel that turns inwardly or outwardly with respect to the transverse axis of the vehicle.
Figure 12:
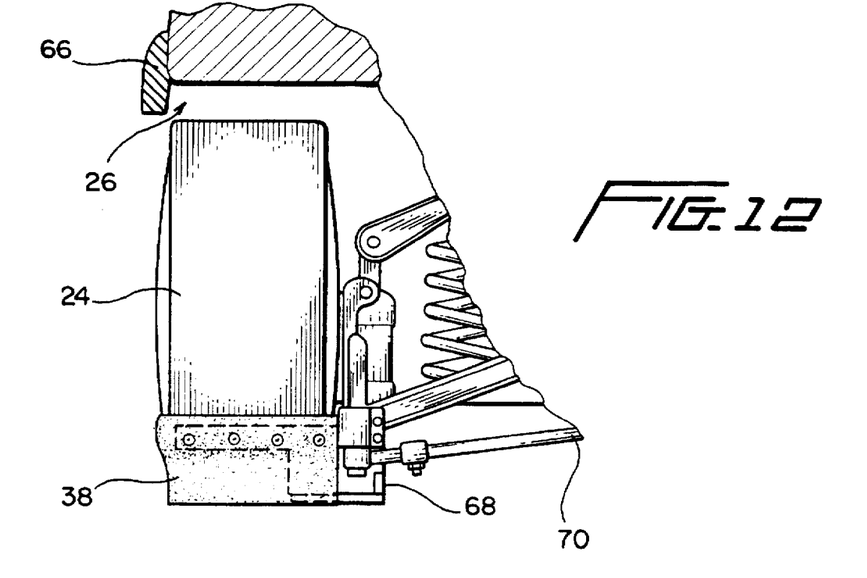
FIG. 12 is a view taken along line 12—12 in FIG. 11 illustrating the positioning of the safety barrier with respect to the wheel, the mounting of the safety barrier to the suspension, and the positioning of the wheel molding with respect to the wheel.

FIG. 11 and FIG. 12 illustrate another embodiment that can be used with a wheel 24 that turns inwardly or outwardly with respect to the transverse axis of the vehicle 22. In this embodiment a turning wheel molding 66 tracks the surface of the wheel well 26, but unlike the wheel molding 32 shown in FIG. 3, the turning wheel molding 66 does not extend over the wheel 24 in a horizontal plane.

FIG. 12 illustrates another aspect of this embodiment. In this embodiment, the frontal guard 38 tracks the movement of the wheel 24 as the wheel turns inward and outward with respect to the transverse axis of the vehicle 22. A suspension guard mount 68 attaches on a first end to the vehicle suspension system. On a second end the suspension guard mount 68 attaches to the frontal guard 38. A movement arm 70 connects to the suspension guard mount 68 and moves the suspension guard mount 68 and frontal guard 38 to track the inward and outward movements of the wheel 24. The inward and outward movements of the wheel 24 are sensed and the movement arm 70 is moved in accordance therewith by conventional means (not shown).

Figure 13:
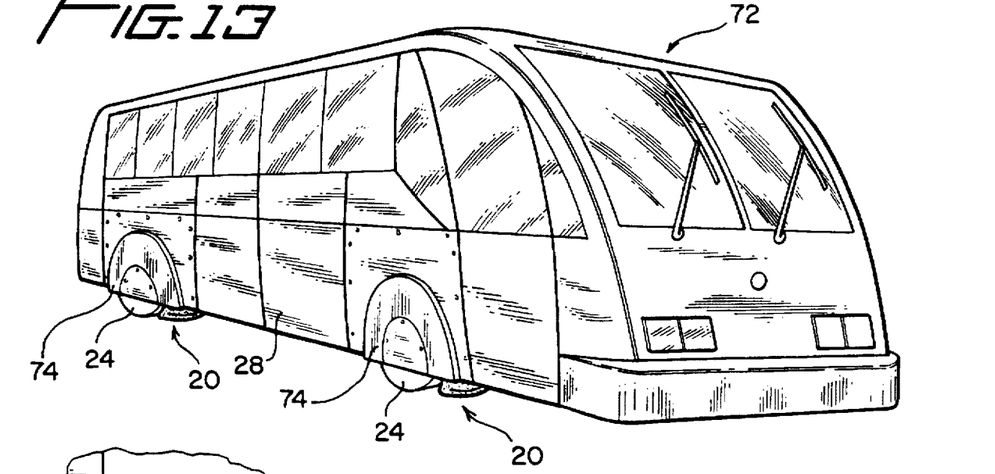
FIG. 13 illustrates a futuristic bus design with fairing wheel covers and safety barriers.
Figure 14:
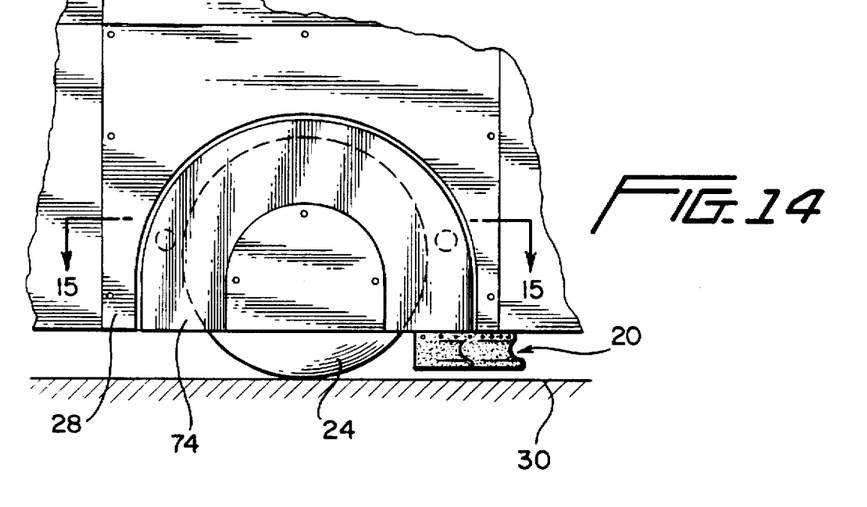
FIG. 14 illustrates the fairing wheel cover and the placement of the safety barrier.

FIG. 13 illustrates a futuristically-designed vehicle 72 equipped with fairing wheel covers 74 and safety barriers 20. FIG. 14 further illustrates the fairing wheel cover 72 and shows a body mounted safety barrier 20 attached to the vehicle body 28.

Figure 15:
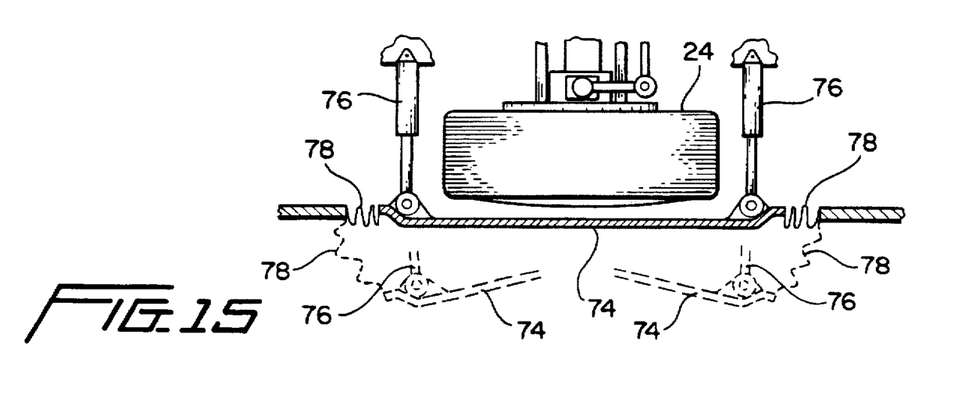
FIG. 15 is a view taken along line 15—15 in FIG. 14 illustrating flexible recordian material connected to fairing wheel covers and the ability of the fairing wheel cover to move tracking the movement of a wheel that turns inwardly or outwardly with respect to the transverse axis of the vehicle.

In an embodiment illustrated in FIG. 15, the fairing wheel cover 74 overlies the wheel 24 and the fairing wheel cover 74 tracks the movement of a wheel 24 that turns inwardly or outwardly with respect to the transverse axis of the vehicle 72. In this embodiment, fairing movement arms 76 cause the fairing wheel cover 74 to turn when the wheel 24 turns so that the wheel 24 does not strike the fairing wheel cover 74. The turning of the wheel 24 is sensed by conventional means (not shown), and the actuation of the fairing movement arms 76 is performed by conventional means (not shown). Flexible recordian material 78 is included within the fairing wheel cover 74 to keep the wheel 24 covered when the wheel turns inwardly or outwardly with respect to the transverse axis of the vehicle. FIG. 15 also illustrates the extended position of the fairing movement arm 76, the extension of the flexible recordian material 78 and the extended position of the fairing wheel cover 74, that exists when the wheel 24 turns inwardly or outwardly with respect to the transverse axis of the vehicle 72.

Figure 16:
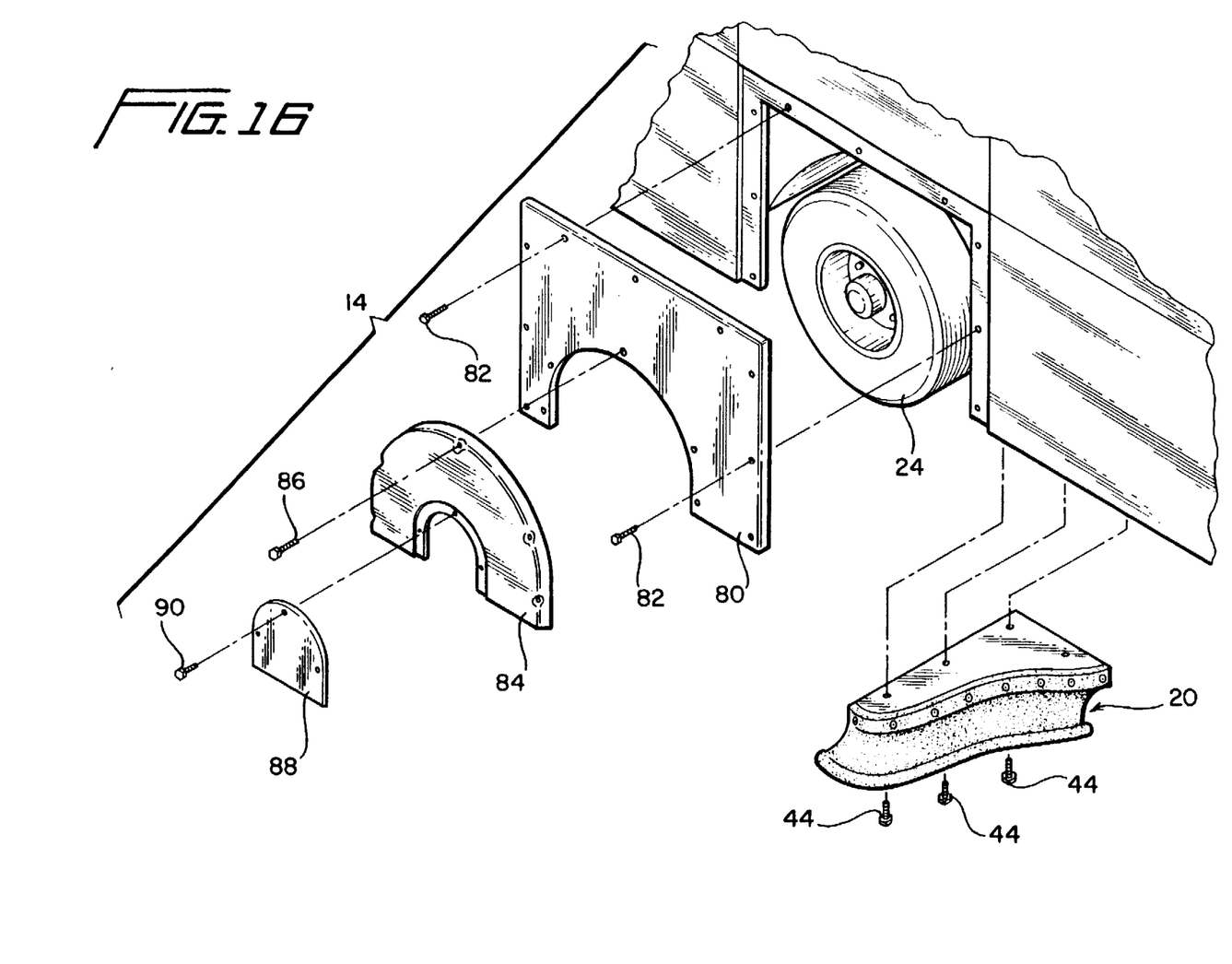
FIG. 16 is an exploded view of the fairing wheel cover, the connection of the fairing wheel cover to the vehicle, and the connection of the safety barrier to the vehicle.

The details of the construction of the fairing wheel cover 74 for a wheel 24 that does not turn inwardly or outwardly with respect to the transverse axis of the vehicle, and the mounting of the safety barrier 20 to the vehicle body 28, are shown in FIG. 16. A main fairing panel 80 attaches to the vehicle body 28 with a plurality of bolts 82, screws, pins, clamps, clasps, or other attachment means widely known in the art. A wheel panel 84 attaches to the main fairing panel 80 with a plurality of bolts 86, screws, pins, clamps, clasps, or other attachment means widely known in the art. A wheel window covering panel 88 attaches to a flanged portion of the wheel panel 84 with a plurality of bolts 90, screws, pins, clamps, clasps, or other attachment means widely known in the art.

The safety barrier 20 is also shown in FIG. 16. In the embodiment shown here, the safety barrier 28 attaches to the vehicle body 28 with a plurality of bolts 44, screws, pins, clamps, clasps, or other attachment means widely known in the art. The safety barrier 20 may be mounted to a futuristic vehicle 72 in any manner described above. That is, the safety barrier 20 may be fixedly mounted to the vehicle body 28, the safety barrier 20 may be mounted to a vehicle axle 50 (this manner of attachment not illustrated in FIG. 16), or the safety barrier 20 may be mounted so as to track the movement of a wheel 24 that turns inwardly or outwardly with respect to the transverse axis of the vehicle (this manner of attachment not illustrated in FIG. 16).

Figure 17:
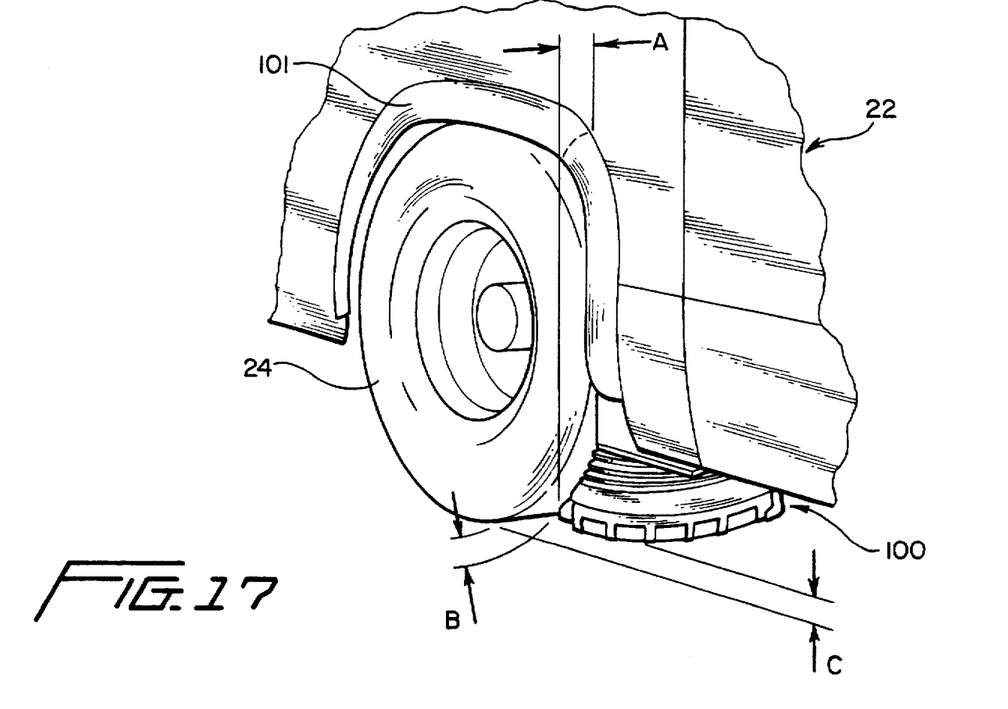
FIG. 17 illustrates the mounting of another safety barrier arrangement in accordance with the present invention to a vehicle chassis.

FIG. 17 generally illustrates at 100 another safety barrier constructed in accordance with the present invention. This safety barrier is preferably used in combination with a wheel molding 101 which is constructed in a substantially identical manner to that described above with respect to wheel molding 66, however, it should be understood that neither of these moldings is limited for use on just the steerable wheels of the vehicle 22.

Figure 18:
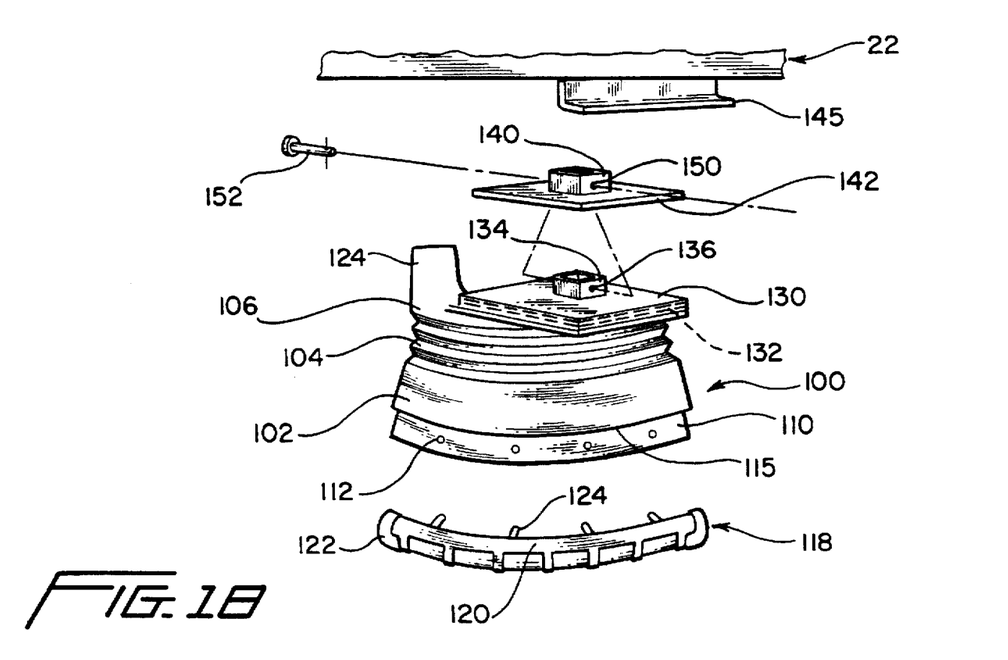
FIG. 18 is an exploded view of the safety barrier arrangement depicted in FIG. 17.

With specific reference to FIG. 18, safety barrier 100 includes a lower portion 102, a central portion 104 and an upper portion 106. Lower portion 102 actually includes a lowermost portion 110 that is formed with a plurality of spaced through holes 112. Lowermost portion 110 is actually recessed from an outer surface of lower portion 102 such that a ledge 115 is defined. Lowermost portion 110 is specifically adapted to have secured thereto a wear strip 118 having a main body portion 120. Main body portion 120 preferably has secured thereto a plurality of wear pads 122. As safety barrier 100 is formed from an elastic material such as urethane, it is preferable to utilize wear pads 122 which, in turn, are preferably made from a hardened steel. Wear pads 122 permit safety barrier 100 to have an extended life since, on occasion, safety barrier 100 will likely encounter obstacles such as curbs and the like. Body portion 120 of wear strip 118 carries a plurality of spaced fastener member 124 which are adapted to extend through openings 112 provided in lowermost portion 110. Fasteners 124 can take various forms but are preferably threaded fasteners which can extend through respective holes 112 and are used in combination with nuts (not shown) for fixedly securing wear strip 118 to lowermost portion 110.

Central portion 104, as clearly depicted in these Figures, is generally bellows-like in construction which advantageously provides a limited degree of flexibility to safety barrier 100. Therefore, if safety barrier 100 was to hit a fixed obstacle during use of the vehicle 22, central portion 104 will provide a limited degree of flexibility to prevent safety barrier 100 from breaking. However, central portion 104 is sufficiently rigid such that forces exerted upon safety barrier 100 by movable objects can be readily counteracted. Upper portion 106 of safety barrier 100 is formed with an upwardly extending side flange 124 which is shaped to conform with wheel molding 101, as well as the body of vehicle 22, as clearly shown in FIG. 17. Upper portion 106 is also formed with a mounting portion that has embedded therein a mounting plate 132. Welded or otherwise fixedly secured to mounting plate 132 is an upstanding polygonal-shaped mounting post 134. Mounting post 134 is provided with aligned apertures, one of which is indicated at 136.

Mounting post 134 is adapted to be received within a fixed mounting tube 140 carried by an auxiliary mounting plate 142. Mounting tube 140 is correspondingly polygonal-shaped and is provided with aligned apertures 150. Auxiliary mounting plate 142 is adapted to be welded or otherwise fixedly secured to a chassis member 145 of vehicle 22. With this construction, safety barrier 100 can be readily secured to vehicle 22 in a non-rotatable manner by inserting mounting post 134 within mounting tube 140 and inserting a pin 152 through aligned apertures 136 and 150. Pin 152 preferably has a through hole (not shown) at an end thereof which can receive a cotter pin or the like to selectively maintain pin 152 in the aligned apertures 136 and 150.

From the above description, it should be readily apparent that safety barrier 100 can be readily attached to or removed from vehicle 22 in a safe and convenient manner. Although only a single attachment arrangement is illustrated between safety barrier 100 and vehicle 22, it should be readily apparent to one of ordinary skill in the art that various types of attaching arrangements could be provided and additional attachment structures could also be utilized. Utilizing polygonal-shaped mounting members in the manner described above permits safety barrier 100 to be fixedly secured to vehicle 22 in a non-rotatable manner. In the preferred embodiment depicted and illustrated in FIG. 17, wheel trim 101 is preferably constituted by a flexible urethane member that extends laterally outwardly from the body of vehicle 22 a distance A approximately equal to 1½–2 inches, the rearmost portion of safety barrier 100 is spaced from wheel 24 a distance B which is preferably approximately 2 inches and safety barrier 100 is preferably spaced a distance C from a ground supporting surface in the range of approximately 3 inches. Of course, these distances could change without departing from the spirit of the invention. At this point, it should also be recognized that safety barrier 100 is curved in a manner similar to that described above with respect to the other safety barriers illustrated in the drawings such that the safety barrier 100 is located further rearward of the vehicle 22 at a laterally outwardmost portion than at a lateral inward portion such that safety barrier 100 will tend to guide an animate body that is accidentally positioned beneath vehicle 22 laterally outwardly so as to prevent the animate body from extending under wheel 22 and being crushed.

Thus, a safety guard is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

We claim:

1. In a vehicle having at least two, front steerable wheels, which are spaced in a transverse direction of a body of the vehicle and located rearwardly of a forwardmost side door of the vehicle, and at least one pair of transversely spaced rear wheels which are longitudinally spaced from said front wheels, a safety guard for deflecting animate body parts from in front of at least one of the vehicle's front and rear wheels so as to prevent the animate body parts from being run-over and crushed by the at least one of the vehicle's front and rear wheels comprising:

a frontal guard piece having an upper end portion and a lower end portion which are interconnected by a central body portion, said body portion including an arcuate outer surface, at least a portion of said frontal guard piece being formed from an elastic material; and     means for mounting said frontal guard piece to the body of the vehicle, at a position spaced a marginal distance in front of the at least one of the vehicle's front and rear wheels, rearward of at least a major portion of the forwardmost side door and a slight distance above a ground surface over which said vehicle travels, with said frontal guard piece projecting downward below the body portion of the vehicle such that animate body parts positioned in front of the at least one of the vehicle's front and rear wheels will be deflected by the frontal guard piece transversely outwardly with respect to the body of the vehicle in order to prevent the animate body parts from being run-over and crushed by the at least one of the vehicle's front and rear wheels during movement of the vehicle over the ground surface, said mounting means including a body mounting member adapted to be secured to the vehicle, a mounting plate embedded in the upper end portion of said frontal guard piece, a mounting tube attached to one of the body mounting member and the mounting plate, and a mounting post attached to the other of the body mounting member and the mounting plate wherein the mounting post is received in the mounting tube to mount the frontal guard piece to the vehicle with said frontal guard piece being arranged at an oblique angle to the transverse direction of the body of the vehicle.

2. In a vehicle having at least two, front steerable wheels, which are spaced in a transverse direction of a body of the vehicle and located rearwardly of a forwardmost side door of the vehicle, and at least one pair of transversely spaced rear wheels which are longitudinally spaced from said front wheels, a safety guard for deflecting animate body parts from in front of at least one of the vehicle's front and rear wheels so as to prevent the animate body parts from being run-over and crushed by the at least one of the vehicle's front and rear wheels comprising:

a frontal guard piece having an upper end portion and a lower end portion which are interconnected by a central body portion, said central body portion including an arcuate outer surface, at least a portion of said frontal guard piece being formed from an elastic material, wherein the central body portion of said frontal guard piece constitutes a bellows-like portion which is more flexible than the upper end portion and the lower end portion of said frontal guard piece; and means for mounting said frontal guard piece to the body of the vehicle, at a position spaced a marginal distance in front of the at least one of the vehicle's front and rear wheels, rearward of at least a major portion of the forwardmost side door and a slight distance above a ground surface over which said vehicle travels, with said frontal guard piece projecting downward below the body portion of the vehicle such that animate body parts positioned in front of the at least one of the vehicle's front and rear wheels will be deflected by the frontal guard piece transversely outwardly with respect to the body of the vehicle in order to prevent the animate body parts from being run-over and crushed by the at least one of the vehicle's front and rear wheels during movement of the vehicle over the ground surface, said mounting means including a body mounting member adapted to be secured to the vehicle with said frontal guard piece being arranged at an oblique angle to the transverse direction of the body of the vehicle.

3. In a vehicle having at least two, front steerable wheels, which are spaced in a transverse direction of a body of the vehicle and located rearwardly of a forwardmost side door of the vehicle, and at least one pair of transversely spaced rear wheels which are longitudinally spaced from said front wheels, a safety guard for deflecting animate body parts from in front of at least one of the vehicle's front and rear wheels so as to prevent the animate body parts from being run-over and crushed by the at least one of the vehicle's front and rear wheels comprising:

a frontal guard piece having an upper end portion and a lower end portion which are interconnected by a central body portion, said body portion including an arcuate outer surface, at least a portion of said front guard piece being formed from an elastic material;

a wear strip fixedly secured to the lower end portion of said frontal guard piece, said wear strip being provided with at least one wear pad at a lowermost portion thereof;

means for mounting said frontal guard piece to the body of the vehicle, at a position spaced a marginal distance in front of the at least one of the vehicle's front and rear wheels, rearward of at least a major portion of the forwardmost side door and a slight distance above a ground surface over which said vehicle travels, with said frontal guard piece projecting downward below the body portion of the vehicle such that animate body parts positioned in front of the at least one of the vehicle's front and rear wheels will be deflected by the frontal guard piece transversely outwardly with respect to the body of the vehicle in order to prevent the animate body parts from being run-over and crushed by the at least one of the vehicle's front and rear wheels during movement of the vehicle over the ground surface, said mounting means including a body mounting member adapted to be secured to the vehicle with said frontal guard piece being arranged at an oblique angle to the transverse direction of the body of the vehicle.

4. A safety guard for a vehicle, said vehicle having a first wheel, a first wheel well, a gap between said wheel and said wheel well, a transverse vehicle axis, a suspension system and a vehicle body, said safety guard comprising:

(a) a frontal guard piece with a first surface generally facing obliquely with respect to said transverse vehicle axis, said frontal guard being spaced a marginal distance from the surface over which said vehicle travels; and (b) a suspension guard mount attached on a first end to said suspension system and attached on a second end to said frontal guard piece said suspension guard mount being movable inward and outward in unison with said wheel with respect to said transverse vehicle axis; and (c) movement means for shifting said wheel inward and outward upon steering of the vehicle, said movement means being connected to said suspension guard mount to move said suspension guard mount and to move said frontal guard piece to track inward and outward movements of said wheel with respect to said transverse vehicle axis such that animate body parts positioned in front of said wheel will be deflected by the frontal guard piece transversely outwardly with respect to the vehicle body in order to prevent the animate body parts from being run-over and crushed by said wheel during movement of the vehicle over said surface.

5. The safety guard according to claim 4, wherein said frontal guard piece is formed of rubber.

6. The safety guard according to claim 4, wherein said safety guard further comprises a turning wheel molding mounting to said wheel well, said turning wheel molding including a contoured surface for overlying all but a marginal distance of said gap between said wheel and said wheel well.

7. The safety guard according to claim 4, wherein said safety guard further comprises a fairing wheel cover attached to said wheel well, said fairing wheel cover comprising at least one panel, said panel overlying said wheel.

8. The safety guard according to claim 6, wherein said fairing wheel cover further comprises:

(a) at least one movement arm connected to said panel; and (b) means, connected to said movement arm, for actuating said movement arm to track the turning of said wheel.

* * * * *